United States Patent [19]

Ohls

[11] 4,200,136
[45] Apr. 29, 1980

[54] METHOD FOR MAKING AN OPTICAL WAVEGUIDE COATING DIE

[75] Inventor: James W. Ohls, Horseheads, N.Y.

[73] Assignee: Corning Glass Works, Corning, N.Y.

[21] Appl. No.: 928,984

[22] Filed: Jul. 28, 1978

[51] Int. Cl.² ............................................. B22D 25/00
[52] U.S. Cl. ......................................... 164/6; 51/154;
         51/227 H; 264/334; 350/96.30
[58] Field of Search ................... 164/6, 132; 264/334;
         249/142; 425/461; 350/96.30; 51/227 H, 154

[56]        References Cited
            U.S. PATENT DOCUMENTS

| | | | |
|---|---|---|---|
| 1,349,009 | 8/1920 | Silberstang | 51/227 H |
| 2,476,754 | 7/1949 | Moore | 51/154 X |
| 2,879,676 | 3/1959 | Burkhardt et al. | 425/461 X |
| 3,944,328 | 3/1976 | Kent et al. | 249/142 X |

OTHER PUBLICATIONS

"On Line Fibre Coating Using Tapered Nozzles", P. W. France et al., Proc. 3rd European Conf. on Optical Fiber Communications, pp. 90–92, 1977.

*Primary Examiner*—Robert D. Baldwin
*Attorney, Agent, or Firm*—Kees van der Sterre; Clinton S. Janes, Jr.

[57]                ABSTRACT

A method for making a tapered-bore optical waveguide coating die comprising the steps of forming a mold core consisting of a tapered pin and molding a die around the pin to form the tapered bore, is described.

5 Claims, 5 Drawing Figures

METHOD FOR MAKING AN OPTICAL WAVEGUIDE COATING DIE

Background of the Invention

The present invention is in the field of optical waveguides, and particularly relates to the application of protective coatings to optical waveguide filaments made of glass. A description of glass optical waveguides may be found in U.S. Pat. Nos. 3,659,915 and 3,884,550, and references cited therein.

Glass optical waveguides must exhibit high strength in order to withstand the stresses which are encountered in incorporating them into protective sheathing or cable, in installing the cable, or in use. While such waveguides are typically quite strong as drawn from the blank, this strength is rapidly degraded by surface defects which are introduced into the waveguide through handling.

To preserve the strength of a newly drawn waveguide filament, it is conventional to apply to the waveguide immediately after it is drawn a thin protective coating composed of an organic or inorganic coating material which serves to shield the waveguide during subsequent handling. A variety of coating methods may be used for this purpose, but one common technique is to pass the filament, as it is drawn, into a reservoir of a suitable coating material and out of the reservoir through a small-bore die, often called a coating die. Reference to the use of such a coating die may be found in U.S. Pat. No. 3,980,390 to Yamamoto et al. A flexible waveguide coating die is described by Albarino et al. in U.S. Defensive Publication No. T963,002.

With recent emphasis on increasing waveguide draw speeds, attention has been directed to die design, and the use of coating dies with tapered bores has been proposed. The aforementioned flexible Albarino et al. coating dies have tapered bores, as do the rigid coating dies described by P. W. France et al., in Proc. 3rd European Conf. on Opt. Fib. Comm., pages 90–92 (1977). In theory, the fluid dynamics of tapered bores give rise to forces which tend to center the waveguide in the bore, improving coating concentricity.

However, difficulties have been encountered in attempting to provide small tapered bores, particularly in rigid die materials. The exit hole diameters which are required in such dies are very small (presently on the order of about 100–500 microns), and thus not readily obtained in combination with a gradual degree of taper by conventional machining techniques.

It is therefore a principal object of the present invention to provide a convenient and accurate method for making an optical waveguide coating die having a small tapered bore.

Other objects and advantages of the invention will become apparent from the following description thereof.

Summary of the Invention

In accordance with the present invention, a small-diameter tapered pin is used as a mold core or mandrel around which a coating die is formed by molding. The dimensions and surface finish of the pin are accurately reproduced in the bore of the die body which is produced upon removal of the pin, so that a very smooth, small-diameter tapered bore may be provided.

The mold core for molding the coating die is formed by taper-grinding a length of rod stock by axially rotating the stock between a pair of opposed abrasive surfaces until a tapered pin of a predetermined taper angle and minimum diameter is provided. The abrasive surfaces are substantially planar and have an actual or projected intersection angle which approximates the predetermined taper angle of the pin.

The tapered mold core thus provided is positioned in a molding cavity and a moldable material suitable for the manufacture of a die blank is introduced into the molding cavity so as to at least partly surround the core pin. The molding material is then hardened to form the die blank.

The mold core is thereafter removed from the molded die blank, leaving a tapered, small-diameter bore which reproduces the dimensions of the core, and the die blank is removed from the molding cavity. The die blank may then be machined, if desired, to remove unwanted stock from the bore ends or other surfaces thereof, prior to being fitted into a waveguide coating reservoir. The die is positioned in the reservoir so that the small end of the tapered bore forms the reservoir exit hole, in order to take advantage of the centering forces which arise as the waveguide is drawn out of the reservoir through the tapered bore of the die.

An important difficulty which is overcome by the method herein described is that of forming mold cores which provide tapered bores of very low taper angle and exit hole diameter, e.g., bores with a taper half-angle of 10° or less and an exit diameter in the range of about 100–500 microns. Such cores are difficult to form utilizing conventional machine grinding methods without breaking, bending or burning the core tip, but can readily be provided by taper-grinding between opposed abrasive surfaces as hereinabove described.

Description of the Drawing

The invention may be further understood by reference to the drawings, wherein.

Detailed Description

Figure 1:
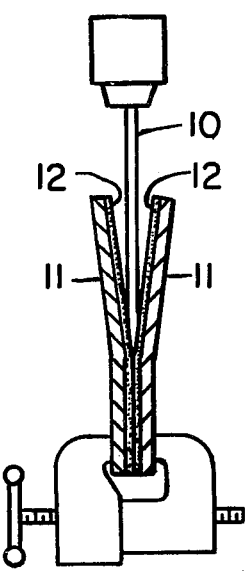
FIG. 1 is a schematic illustration of a rod stock grinding procedure for forming a tapered mold core in accordance with the invention.

Among the materials preferred for use as rod stock in providing a mold core in accordance with the invention are relatively hard, machinable metals such as steel. Steel drill rod stock of a diameter in the range of about 1/32–⅛" is an example of a suitable material. Of course, other machinable metals, or even machinable plastics or ceramics, could also be used, provided that such can be machined to the small dimensions required utilizing the abrasion method herein described.

The problem with conventional methods for machining such materials is that the force which must be applied for cutting or grinding the material tends to cause distortion, resulting in non-uniform dimensions, bending, or breakage of the stock. Through the use of opposed abrasive surfaces, pressure on the pin stock is eliminated and dimensionally stable tapered pins are obtained.

The opposed abrasive surfaces may be rigid or flexible and may consist of essentially any abrasive material. One convenient way of providing such surfaces is to bond abrasive sheeting to each of two flexible metal plates, and then to clamp the plates at one edge with the abrasive surfaces facing each other. Rotating stock inserted between such plates and pointing generally in the direction of the clamp receives a taper grind under balanced opposing pressures dictated in part by the stiffness of the plates. Taper length and angle may be controlled by varying the distance between the end of the rotating stock and the plate clamp, or by using shim stock between the clamped plates.

The abrasive grit used for the process of tapering will depend on the amount of stock to be removed and the surface finish which is desired on the tapered section of the pin. For steel drill rod stock, abrasives ranging from about 180 grit to about 800 grit have been employed. Although the surface finish which is provided on the tapered pin is not critical, a smooth finish greatly facilitates removal of the pin from the molded die blank.

When heavy stock requiring a considerable amount of machining is to be employed, it is possible to use conventional machine tapering methods for the initial phase of stock removal, and then to use opposing abrasive surfaces for pin finish-grinding. The extent to which conventional machining methods can be used for stock removal depends primarily on stock size, and somewhat on the degree of taper, although even at taper half-angles of 10°, it is advantageous to use opposed surface finishing at pin diameters below 500 microns.

After the pin has been tapered to the desired degree it is positioned in a molding cavity in which a die blank is to be formed, and a die molding material is introduced into the cavity and around the pin. The die may be molded with essentially any moldable material from which a coating die may suitably be formed, including but not being limited to metals, plastic resins, filled plastic resins, elastomers, or the like. The preferred material for rigid coating dies is metal, although metal-filled thermosetting plastic resins have also been employed as the die molding material.

The molded die blank produced by the above-described molding step may be directly used as a coating die if the mold has been designed for that purpose. A preferred practice, however, is to cast an oversized die blank and then to remove material by machining methods until an appropriate external die configuration is obtained. This machining typically also includes the removal of some material from the bore ends of the die, in order to adjust the size of the entrance and exit holes of the coating die to specific values.

A cylindrical or so-called 0°-taper bore coating die of the kind presently used in the art is typically produced by drilling methods, as a consequence of which the die bore is often quite rough on a microscopic scale. An important advantage of a molded tapered bore coating die provided in accordance with the present invention is a very smooth bore which is thought to minimize surface damage to the glass waveguide filament and to aid in obtaining a smooth protective coating on the outer surface thereof.

The invention may be further understood by reference to the following detailed examples.

EXAMPLE 1

An abrasive fixture for tapering metal rod stock to provide tapered metal pins is prepared. The fixture consists of a pair of steel plates about $\frac{1}{8}" \times 1" \times 5"$ in size, one flat surface of each plate having been covered with 180 grit alumina-coated abrasive paper adhesively bonded thereto. With their abrasive surfaces in contact, the plates are clamped together at one end in a vice.

A 3" length of cylindrical steel drill rod stock having an outer diameter of about 0.625" is clamped into a drill press chuck. While being rotated at a rate of about 600 rpm the rod is repeatedly inserted between the abrasive faces of the clamped steel plates to produce tapering of the rod end. This procedure is schematically illustrated in FIG. 1 of the drawing, wherein rotating steel rod 10 is shown in position between steel plates 11, each steel plate having a sheet of alumina-coated abrasive paper 12 bonded to the inner surface thereof.

The described grinding procedure is continued until the small end of the tapered section of the rod has been reduced to a diameter of about 0.008". The rod is then finished by insertion with rotation into a similar abrasive fixture wherein 320 grit alumina-coated paper forms the abrasive surfaces. Based on diameter measurements of the tapered section of the stock, a nominal taper half-angle (the angle between the bore axis and the bore wall) of about 3° is provided by this procedure.

The tapered pin thus provided is inserted into the bore of a cylindrical mounting fixture with about 1" of the taper end of the pin exposed. A cylindrical mold cavity is then formed around the exposed portion of the pin using a split cylinder steel shell mold, and a thermosetting aluminum-filled epoxy resin is poured into the molding cavity. This resin is commercially available as Devcon F plastic from the Devcon Corporation, Danvers, Massachusetts.

Figure 2:
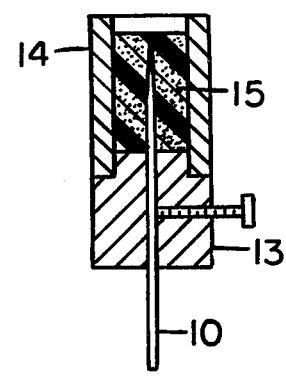
FIG. 2 is a schematic illustration in cross-section of a coating die molding assembly during the molding of a coating die.

An assembly suitable for molding a die blank as above described is illustrated in FIG. 2 of the drawing. As shown in that illustration, tapered pin 10 is clamped into a cylindrical mounting fixture 13 with a portion of the taper exposed. A split cylinder shell mold 14 is positioned around pin 10 and a quantity of filled plastic resin 15 is poured into mold 14 and around the end portion of pin 10.

Figure 3:
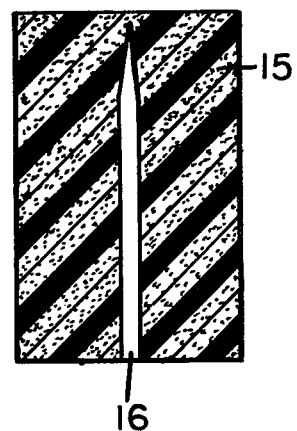
FIG. 3 is a schematic illustration in cross-section of a coating die after removal from the molding assembly.

After the plastic resin has hardened, the mold pieces are removed and the tapered pin is withdrawn from the center of the casting to provide a rigid die blank having a tapered bore. Such a die blank is schematically illustrated in FIG. 3 of the drawing, wherein a hardened resin casting 15 having cylindrical bore 16 is shown.

The die blank is then machined for the purpose of removing material from the bore ends thereof until a coating die having a thickness of about 0.0705", wherein the diameter of the entrance hole is about 0.0185" and the diameter of the exit hole is about 0.011" has been provided. This die is then positioned in the bottom of a waveguide coating reservoir to which a quantity of cellulose acetate-based lacquer coating material is added.

An 1100 meter length of glass optical waveguide having a diameter of about 125 microns is drawn through the coating reservoir and die at a rate of about 0.8 meters per second. The die produces a continuous protective coating having an average thickness of about 5 microns on the surface of the waveguide.

EXAMPLE 2

Using the abrasive fixture and procedure described in Example 1, a tapered pin is provided by taper-grinding 3/32" diameter cylindrical steel drill rod stock. Grinding is continued until the diameter of the stock at the small end of the tapered section is about 0.005".

The tapered pin thus provided is inserted into a molding cavity as described in Example 1, with about 1" of the tapered end extending into the molding cavity. Aluminum-filled epoxy resin is poured into the cavity and hardened, after which the outer mold pieces are removed and the tapered pin is withdrawn from the casting to provide a rigid die blank with a tapered bore.

Figure 4:
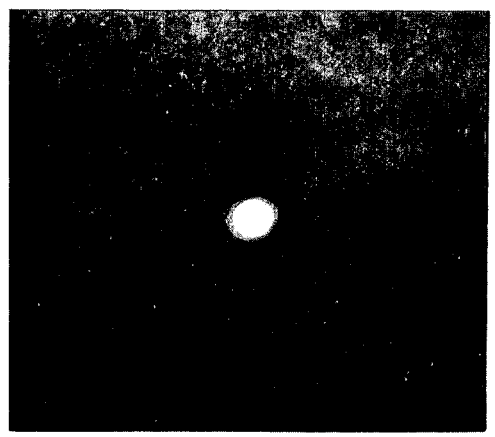
FIGS. 4 and 4a are microphotographs of the exit and entrance holes of a tapered bore die provided in accordance with the invention.
Figure 4A:
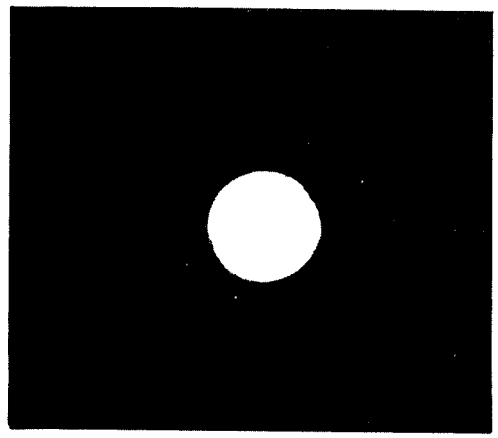

Material is machined from the bore ends of the blank to provide a coating die about 0.70" in length, having an entrance hole about 0.030" in diameter and an exit hole about 0.008" in diameter. The average taper half-angle over the length of the tapered bore is about 1°. The symmetry and smoothness of this tapered bore are illustrated by the microphotographs constituting FIGS. 4 and 4a of the drawing. FIG. 4 is a photograph taken at 30× magnification of the 0.008-inch diameter exit hole of the die, and FIG. 4a is a photograph at the same magnification of the 0.030" entrance hole of the die.

EXAMPLE 3

Using the abrasive fixture and procedure described in Example 1, a tapered pin is provided by taper-grinding ⅛" diameter cylindrical steel drill rod stock. Grinding is continued until the diameter of the stock at the small end of the tapered section is about 0.007".

The tapered pin thus provided is inserted in a mold cavity with about 1⅛" of the tapered end of the pin extending into the cavity. Thereafter the cavity interior and pin are sprayed with a molybdenum disulfide release agent.

The molding cavity is then filled with molten tin/antimony solder, consisting of about 95% tin and 5% antimony by weight. After the solder has solidified, the outer mold pieces are removed and the tapered pin is withdrawn from the center of the casting to provide a metal die blank having a tapered bore.

Metal is machined from the bore ends of this die blank to produce a coating die having a length of about 0.350", wherein the entrance hole has a diameter of about 0.031" and the exit hole has a diameter of about 0.010". The average taper half-angle of the bore over the length of the die is about 1.5°.

This coating die is positioned at the exit end of a waveguide coating reservoir to which a quantity of a silicone resin coating material is added. A length of glass optical waveguide having an average diameter of about 125 microns is drawn into the coating reservoir and out through the die at a rate of about 0.8 meters per second. The die deposits a continuous coating of resin about 50 microns in thickness on the surface of the waveguide.

Of course, the foregoing examples are merely illustrative of procedures which can be used to provide a tapered-bore coating die in accordance with the invention. Obviously, numerous modifications and variations of these procedures may be resorted to by one skilled in the art to attain the objectives of the invention within the scope of the appended claims.

I claim:

1. A method for making an optical waveguide coating die with a small tapered bore, said bore having a taper half-angle not exceeding about 10° and a diameter at its small end not exceeding about 500 microns, which comprises the steps of:
   (a) taper-grinding a length of rod stock by rotating the stock between a pair of opposed abrasive surfaces to form a mold core consisting of a tapered pin, said abrasive surfaces being substantially planar, having an actual or projected intersection angle approximating the taper angle of said pin, and acting to prevent breaking, bending and burning of said pin;
   (b) positioning the mold core in a molding cavity;
   (c) introducing a moldable material into the molding cavity and around the mold core;
   (d) hardening the moldable material in the molding cavity to form a die blank; and
   (e) removing the mold core from the die blank and the die blank from the molding cavity, thus to provide a die having a small tapered bore.

2. A method in accordance with claim 1 wherein the rod stock consists of cylindrical steel rod.

3. A method in accordance with claim 1 wherein the moldable material is selected from the group consisting of metals, plastic resins, filled plastic resins and machinable ceramics.

4. A method in accordance with claim 1 wherein the moldable material is metal.

5. A method for making an optical waveguide coating die having a small tapered bore which comprises the steps of:
   (a) taper grinding a length of metal rod stock by rotating the stock between a pair of clamped flexible abrasive plates to provide a tapered pin having a taper half-angle not exceeding about 10° and a diameter at its small end not exceeding about 500 microns;
   (b) molding a rigid die blank around the tapered pin; and
   (c) withdrawing the tapered pin from the rigid die blank to provide a die blank with a tapered bore.

* * * * *